US006617743B1

(12) United States Patent
Potocnik et al.

(10) Patent No.: US 6,617,743 B1
(45) Date of Patent: Sep. 9, 2003

(54) PLANE COMMUTATOR, METHOD FOR PRODUCING THE SAME AND CONDUCTOR BLANK AND CARBON DISK FOR USING TO PRODUCE THE SAME

(75) Inventors: Joze Potocnik, Idrija (SI); Marjan Drmota, Idrija (SI)

(73) Assignee: Kolektor D.O.O., Idrija (SI)

(*) Notice: Subject to any disclaimer, the term of this patent is extended or adjusted under 35 U.S.C. 154(b) by 0 days.

(21) Appl. No.: 10/148,365

(22) PCT Filed: Nov. 23, 2000

(86) PCT No.: PCT/IB00/01826

§ 371 (c)(1),
(2), (4) Date: Sep. 24, 2002

(87) PCT Pub. No.: WO01/39336

PCT Pub. Date: May 31, 2001

(30) Foreign Application Priority Data

Nov. 26, 1999 (DE) ........................................ 199 56 844

(51) Int. Cl.[7] ................................................ H02K 13/04
(52) U.S. Cl. .......................... 310/237; 310/235; 29/597
(58) Field of Search ................................ 310/231, 235, 310/237; 29/597

(56) References Cited

U.S. PATENT DOCUMENTS 1,360,166 A 11/1920 Zenk .......................... 310/235
5,552,652 A * 9/1996 Shimoyama et al. ....... 310/237
5,826,324 A * 10/1998 Abe et al. ...................... 29/597
5,912,523 A * 6/1999 Ziegler et al. .............. 310/237
5,996,210 A * 12/1999 Konig .......................... 29/597
6,160,337 A * 12/2000 Warner ........................ 310/233

FOREIGN PATENT DOCUMENTS

| | | | |
|---|---|---|---|
| DE | 89 08 077.7 | 12/1989 | H01R/39/06 |
| DE | 40 28 420 | 3/1992 | H02K/13/04 |
| DE | 92 11 488 U | 11/1992 | H01R/39/06 |
| DE | 196 52 840 A | 6/1997 | H02K/5/132 |
| EP | 0 523 649 A | 1/1993 | H02K/13/04 |
| GB | 2 247 994 A | 3/1992 | H02K/13/04 |
| JP | 07-298565 | * 11/1995 | H03K/13/04 |
| JP | 10-257736 | * 9/1998 | H02K/23/00 |

* cited by examiner

*Primary Examiner*—Karl Tamai
(74) *Attorney, Agent, or Firm*—Katten Muchin Zavis Rosenman

(57) ABSTRACT

A flat commutator for an electrical machine comprises a support body (1) made of an insulating molding compound, a plurality of conductor segments (3) and an equal number of carbon segments (4), which are disposed at the ends and are connected in electrically conductive relationship to the conductor segments (3). Each of the conductor segments (3) is provided with a thick-walled terminal region (6) disposed on the periphery of the support body (1), a contact region (7), which is also thick-walled, disposed between the support body (1) and the associated carbon segment (4), and a thin-walled transition region (8) disposed between the terminal region (6) and the contact region (7).

38 Claims, 12 Drawing Sheets

Figure 1:
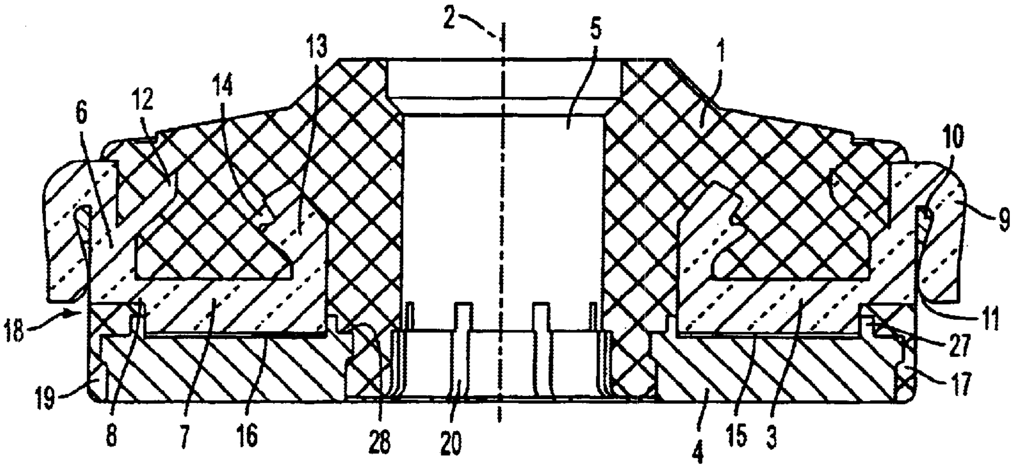

PLANE COMMUTATOR, METHOD FOR PRODUCING THE SAME AND CONDUCTOR BLANK AND CARBON DISK FOR USING TO PRODUCE THE SAME

The present invention relates to a flat commutator for an electrical machine, comprising a support body made of an insulating molding compound, a plurality of conductor segments and an equal number of carbon segments, which are disposed at the ends and are connected in electrically conductive relationship to the conductor segments. The present invention also relates to a production method as well as to a conductor blank and a carbon disk for use in production of such a flat commutator.

Flat commutators of the type cited in the foregoing are found in many different versions in the prior art. Examples in this connection are published in U.S. Pat. No. 5,175,463 A1, German Utility Model 98007045 U1, German Patent 19752626 A1, U.S. Pat. No. 5,255,426 A1, German Patent 19652840 A1, International Patent WO 97/03486, German Patent 19601863 A1, German Patent 4028420 A1, European Patent 0667657 A1, U.S. Pat. No. 5,442,849 A1, International Patent WO 92/01321, German Patent 19713936 A1, U.S. Pat. No. 5,637,944 A1 and German Patent 19713936 A1. Further pertinent prior art can be found in U.S. Pat. No. 5,629,576 A1, German Patent 19903921 A1 and European Patent 0935331 A1. The large number of protective rights relating to flat commutators with carbon running surfaces proves the great need for practical commutators of this design, which are used in particular to drive fuel pumps in motor vehicles. At the same time, it can be inferred from the large number of publications that there exists a large number of problems, which have not yet been solved satisfactorily.

One of the reasons for this situation is that different and partly conflicting requirements exist for known flat commutators of the class in question; they include in particular the objectives of small dimensions, low manufacturing costs and long commutator life. A particularly serious conflicting relationship among those cited above exists between reducing the dimensions and lengthening the life of the flat commutator, since the wires of the rotor winding are generally welded to the conductor segments. If the dimensions of the flat commutator are too small, the electrically conductive connections of the conductor segments to the carbon segments can easily be damaged by overheating, in turn leading to reduced life of the flat commutator. The reality is that, if the known flat commutators described in the documents cited above are based on a soft-soldered electrically conductive connection between the carbon segments and the conductor segments, they are not used in practice because of the aforesaid problems and the resulting unsatisfactory life. This is the background for proposals such as using a silver solder having resistance to high temperature to connect the carbon segments to the conductor segments (see European Patent 0935331 A1) or to position the contact points between conductor segments and carbon segments relatively far from the leads of the rotor winding (see German Patent 19903921 A1). The first of these proposals is burdened with additional costs, however, and the second proposal involves larger dimensions of the commutator.

The object of the present invention is to provide a flat commutator of the type cited in the introduction that can be produced relatively inexpensively and at the same time has a long life despite relatively small dimensions. Another object of the present invention is to provide a method for production of such a flat commutator as well as particularly expedient intermediate products used in such a production method.

The object stated in the foregoing is achieved according to the present invention by the fact that, in a flat commutator of the type mentioned in the introduction, the conductor segments are each provided with a thick-walled terminal region disposed on the periphery of the support body, a contact region, which is also thick-walled, disposed between the support body and the associated carbon segment, and a thin-walled transition region disposed between the terminal region and the contact region. In other words, what is of substantial importance for the inventive flat commutator is that the conductor segments are no longer constructed with more or less constant wall thickness throughout, but instead the wall thicknesses of different regions of the conductor segments differ significantly from one another, specifically in that a relatively thin-walled transition region is provided between the terminal region used as the terminal of the rotor winding and the contact region via which the electrically conductive connection of the conductor segment is established to the associated carbon segment. In each case the wall thickness—determined perpendicular to the heat-flow direction—of the transition region is smaller than the wall thickness—measured in radial direction—of the terminal region and the wall thickness—measured in axial direction—of the contact region of the conductor segment in question, in addition to which the terminal region also has relatively large dimensions in axial and in peripheral direction (see below). Such a configuration of the conductor segments ensures in particular that welding of the winding wires to the terminal regions of the conductor segments does not cause overheating damage to the electrically conductive connections of the conductor segments to the carbon segments even in extremely compact flat commutators having the smallest dimensions, since the thick-walled terminal regions of the conductor segments represent, by virtue of their high heat capacity, a first heat sink for the heat developed during the welding process. In contrast, by virtue of its small cross-sectional area—normally aligned with the heat flow—for heat conduction from the terminal region to the contact region of the conductor segments, the thin-walled transition region from the terminal region to the contact region forms a considerable resistance. And, in turn, the thick-walled contact region forms an excellent heat sink for the thermal energy (which in any case is reduced) conducted through the transition region. The outcome is that the contact region of the conductor segments is not heated nearly as severely during welding of the wires of the rotor winding to the conductor segments as is known from the prior art. When conventional welding techniques are used in combination with the present invention, the maximum temperatures occurring at the connection of the conductor segments to the carbon segments can be lowered by 50° C. or even more compared with known flat commutators belonging to the class in question. Consequently, the danger that the electrically conductive connections of the carbon segments to the conductor segments will be damaged during welding of the rotor winding to the flat commutator is decisively reduced. By application of the present invention, it is even possible permanently to connect the carbon segments electrically to the conductor segments by soft soldering, since the temperatures occurring at the contact point remain reliably under the softening point for soft solder. This is true even for extremely compact flat commutators. In this connection, another benefit of the application of the present invention is that the need no longer exists to position the electrically conductive connection of the carbon segments to the conductor segments as far as possible from the terminal regions of the conductor segments, which heretofore has frequently led to relatively small contact areas, disposed in radially inner position, between the carbon segments and the conductor segments. To the contrary, by application of the present invention, it is entirely possible to establish large-size contact areas between the conductor segments and the carbon segments, with favorable consequences for the life of the connection in question.

Incidentally, the resistance to thermal conduction (see above) of the thin-walled transition region explained in the foregoing and provided according to the invention between the terminal region and the contact region of each conductor segment is not its only advantageous effect. Another aspect to be emphasized is the elastic axial compliance that the thin-walled transition regions confer—during production of the flat commutator—on the contact regions of the conductor segments if, as is provided according to the preferred improvement of the invention explained hereinafter, the annular carbon disk is maintained at a spacing—subsequently filled with molding compound—from the terminal regions and the transition regions of the conductor blank, since this axial elastic compliance limits the force exerted on the annular carbon disk during closing of the injection-molding die after the composite part formed from conductor blank and annular carbon disk has been placed in an injection-molding die for injection molding of the support body. By virtue of the elasticity of the transition regions and the resulting axial yielding of the contact regions that becomes possible during closing of the injection-molding die, the pressure exerted on the annular carbon disk is controllable. The main closing force is transformed to compressive stresses in the terminal regions as well as in any bridging parts and connecting webs (see below) joining them; even such closing forces that lead to deformation of the conductor blank by 1 to 4% in axial direction can be applied without damaging the annular carbon disk. In this way the commutator can be made exactly to its specified dimension in the injection-molding die, regardless of tolerances, which are unavoidable for economic production of the annular carbon disk and of the conductor blank. Subsequent re-machining of the end faces can be dispensed with, thus permitting cost savings. The effective limitation of the pressure acting on the annular carbon disk reduces the risk of damage to the annular carbon disk during production of the flat commutator, and in this way contributes to reducing the rejects. The present invention also makes it possible to use, for production of the annular carbon disk, relatively inexpensive material such as plastic-bonded carbon, which is relatively sensitive to pressure, brittle and susceptible to damage.

The axial yielding explained in the foregoing, of the contact regions of the conductor blank together with the annular carbon disk bearing thereagainst relative to the terminal regions of the conductor blank, is favored in particular when the transition regions are aligned substantially in radial direction and have a minimum extent corresponding to approximately 5%, preferably approximately 8 to 10% of the radius of the finished flat commutator. For small commutators of common overall sizes (diameter about 20 mm), this means that the transition regions would extend for a radial minimum distance of at least 1 mm.

According to a preferred improvement of the invention—already alluded to briefly in the foregoing—it is provided that the transition regions of the conductor segments are attached to the contact regions of the conductor segments at some distance from the carbon segments. In this way a gap, which can be filled with a layer of molding compound, is formed in each case between the transition regions and possibly the terminal regions of the conductor segments on the one hand and the carbon segments on the other hand. The terminals of the transition regions spaced apart from the contact area of the contact regions of the conductor segments result in considerably reduced heat transfer from the transition regions of the conductor segments to the carbon segments. Another effect of the layer of molding compound is that the electrically conductive connections between the contact regions of the conductor segments and the carbon segments are better protected against aggressive media.

Within the scope of the present invention, some room for variation of the configuration exists with regard to orientation of the transition regions. From viewpoints of heat engineering, the transition regions can be oriented either radially or axially in particular, although arbitrary intermediate conditions are also conceivable. As regards inexpensive manufacture of the flat commutator, substantially radial orientation of the transition regions is particularly favorable, as explained hereinabove.

As regards the different wall thicknesses of the conductor segments in their various regions, provided according to the invention as explained in the foregoing, it has been found particularly favorable to produce a conductor blank, such as is used for making the inventive flat commutator, by a combined extrusion and stamping technique. In the first step a cup-like base member, already provided with thick-walled terminal regions, thin-walled transition regions and, in turn, thick-walled contact regions, is made by extrusion. The contact regions and if necessary the transition regions also are joined to one another to form a closed ring. The bottom of the base member is then segmented by stamping.

The ideal dimensions of the individual regions of the conductor segments, especially the different wall thicknesses and their relative ratios, depend on different influencing variables. In the case in which the wall thickness of the transition regions of the conductor segments is less than 80% of the wall thickness of the contact regions, however, it is already obvious that the life of the electrically conductive connections between the carbon segments and the conductor segments is significantly improved compared with the prior art. In a particularly preferred embodiment, an even larger wall-thickness difference is achieved by making the wall thickness of the transition regions of the conductor segments less than 60% of the wall thickness of the contact regions. If the transition regions are attached to the contact regions of the conductor segments at a distance from the carbon segments, this increases the distance of the transition regions of the conductor segments from the carbon segments. Incidentally, as regards dimensioning of the contact regions, it has been found advantageous to make the wall thickness of the contact regions at least 0.4 times the value of the extent of the contact regions in peripheral direction.

Incidentally, the terminal regions are preferably given sufficiently large dimensions in peripheral and axial directions that convenient space is available for a double electrode on both sides of the terminal hook. In this sense the terminal regions preferably extend over at least 65%, particularly preferably over at least 80% of the periphery of the flat commutator. Incidentally, such large dimensioning of the terminal regions favorably influences the heat capacity of the terminal regions and thus favors the inventive thermal behavior.

It has already been explained hereinabove that, during application of the present invention, there is no need to concentrate the electrically conductive connections between the carbon segments and the conductor segments in relatively small contact regions disposed in radially inward position. Within the context of maximizing the area available for the electrically conductive connections, a preferred improvement of the present invention is characterized in that the contact regions of the conductor segments are in contact over their entire surface with the end faces of the carbon segments. These contact areas on the end faces of the carbon segments can be completely or partly surrounded by frame-like raised portions whose periphery is closed or else open, whose contour is matched to the contour of the contact regions of the conductor segments and which are used for adjustment of the annular carbon disk and conductor blank relative to one another during production of the flat commutator. Once again, this feature also is to be seen in connection with the method mentioned hereinabove for production of the conductor blank by combined extrusion and stamping, since thick-walled contact regions, which are suitable for contact with the carbon segments over their entire surface inside those frame-like raised portions, cannot be produced if the conductor blank is formed from metal sheet by deep drawing, as has been frequently practiced heretofore.

If the frame-like raised portions explained in the foregoing are not used, the contact areas can extend over the entire associated end faces of the carbon segments, so that the carbon segments are connected in electrically conductive relationship over their entire surface with the contact regions of the conductor segments.

In the region of the contact areas of the carbon segments mentioned in the foregoing, it can be particularly preferable to accommodate an electrically conductive contact material between the contact regions of the conductor segments and the carbon segments. Soft solder (see above) is one possible example of such a material. Other examples, however, are granules, powder and/or lamellas of a metal, such as silver, since in particularly preferred improvements of the inventive flat commutator, which will be described in greater detail hereinafter, the soldered or similar connection between the contact regions and the carbon segments does not have to be capable of bearing mechanical load if the carbon segments are firmly embedded at the radially inner and outer peripheral faces in the support body formed from molding compound.

Within the context explained in the foregoing, it is particularly preferable for each carbon segment to be covered at its radially outer peripheral faces by a molding-compound jacket formed by the support body, and it is particularly preferable for interlocking connections to be provided between the outer peripheral faces of the carbon segments and the molding-compound jackets. Such connections can have any known form, such as a stepped structure, a toothed structure, a sawtooth-type toothed structure or the like. A particularly preferred form is a corrugated structure.

A particularly preferred improvement of the inventive flat commutator is characterized in that the terminal regions of the conductor segments are provided with an axial groove which extends in peripheral direction and in which there engages a rib of the molding-compound jacket. Hereby there is achieved toothed engagement of the molding-compound jacket with the associated conductor segment, and this has a particularly positive effect on the stability of the commutator. In particular, this groove can initially have rectangular shape, impressed into the bottom of the first stage of the conductor blank produced by extrusion during stamping of the said bottom. During closing of an injection-molding die, in which the composite part resulting from joining the conductor blank together with the annular carbon disk (see below) is placed in order to mold the support body of molding compound, the outer boundaries of an appropriately shaped groove become deformed radially inward under the closing forces, giving the groove an undercut configuration; this leads to particularly firm retention of the molding-compound rib in the groove.

In a particularly preferred embodiment, the terminal regions of the conductor segments project radially beyond the outer peripheral faces of the molding-compound jacket explained in the foregoing. This feature is to be seen in connection with the particularly preferred production method described hereinafter and with the conductor blank used to perform this method.

A further preferred improvement of the inventive flat commutator is characterized in that the core of the support body covers the radially inner peripheral faces of the carbon segments while forming interlocking connections. Especially in combination with the molding-compound jackets that cover the outer peripheral faces of the carbon segments as explained in the foregoing, a sufficiently robust mechanical connection of the carbon segments to the support body is achieved, and so there is no need for the connection between the contact regions of the conductor segments and the carbon segments to be capable of bearing mechanical load (see above).

Yet another preferred embodiment of the invention is characterized in that contact lugs chamfered at the end are disposed on the terminal regions. Such chamfering, which faces the outer peripheral face of the associated terminal region, leads to a decrease in size of the contact area between the contact lugs bent against the terminal regions of the conductor segments and the terminal regions of the conductor segments close to the connection to the carbon segments. This in turn is favorable as regards minimizing transfer, during welding of the wires of the rotor winding to the conductor segments, of the heat produced to the electrically conductive connections between the terminal regions of the conductor segments and the carbon segments.

It is also advantageous for the carbon segments to have stepped structure at their outer peripheral edges facing the conductor segments. In this way an annular reinforcement of molding compound is formed in this region, thus achieving particularly good protection of the edge in question of the carbon disk.

The conductor blank used expediently for production of the foregoing commutator comprises a plurality of conductor segments, each two of which are connected to one another via a bridging part, wherein the conductor segments are each provided with a thick-walled terminal region disposed at the outer periphery of the conductor blank, with a contact region, which is also thick-walled, disposed at the end faces, and with a thin-walled transition region disposed between the terminal region and the contact region. In this case it is particularly preferred for the bridging parts to be disposed between the terminal regions of two neighboring conductor segments, specifically in such a way that the bridging parts and the terminal regions of the conductor segments have the same axial extent and, via connecting webs, are connected to one another along their entire axial extent. By virtue of the arrangement and dimensioning of the bridging parts as described in the foregoing, areas in the form of closed rings, lying respectively in a plane disposed perpendicular to the axis, are formed on both end faces of the tubular conductor blank.

These are eminently suitable as sealing faces for the two halves of an injection-molding die, which is used for injection molding of the support body of molding compound. The tubular conductor blank, whose periphery is closed by the terminal regions, the bridging parts and the connecting webs, thus interacts with the two halves of the injection-molding die in such a way that the space to be filled with molding compound is tightly sealed.

Incidentally, the tubular geometry of the conductor blank ensures that the two halves of the injection-molding die are disposed in exactly opposite positions in the region of respective sealing face that they form together with the conductor blank. This is particularly favorable in view of the large closing forces, since they are absorbed by the conductor blank without unacceptably large deformation. Essentially the closing forces cause only compressive stresses in the tubular conductor blank.

As a result of the annular bracing of the two halves of the injection-molding die against the two oppositely disposed annular sealing faces of the conductor blank as explained hereinabove, the outer peripheral faces of the molding-compound jackets, if such are provided, are disposed at a smaller distance from the commutator axis than the outer peripheral faces of the terminal regions of the conductor segments. Accordingly, the terminal regions of the conductor segments project radially beyond the outer peripheral faces of the molding-compound jackets, thus forming a step.

In a particularly preferred embodiment, the wall thickness of the connecting webs explained hereinabove is considerably smaller than the wall thickness of the bridging parts. This is sufficient to withstand the pressure developed during injection molding of the support body of molding compound. The small wall thickness of the connecting webs facilitates subsequent removal of the bridging parts after molding of the support body. In this connection it proves to be particularly advantageous for the distance of the radially inner peripheral faces of the bridging parts from the commutator axis to be at least equal to, and particularly preferably even to be slightly larger than the distance of the radially outer peripheral faces of the terminal regions of the conductor segments from the commutator axis, since this makes it possible to shear or knock the bridging parts off by an axially acting punch after molding of the support body. In this case laborious turning of the outer peripheral face of the flat commutator to remove the bridging parts is not necessary.

Within the scope of production of the inventive flat commutator, it is particularly preferable to use an annular carbon disk. This is joined together with the conductor blank and, in a particularly preferred embodiment, the contact regions of the conductor segments bear against the end face of the annular carbon disk over contact areas which are completely or partly surrounded by peripherally closed or else open frame-like raised portions, whose inside contour corresponds to the outside contour of the contact regions of the conductor segments (see above). The unit comprising conductor blank and annular carbon disk is then placed in an injection-molding die for formation of the support body of molding compound. After the support body has been molded, the annular carbon disk is subdivided into individual carbon segments by separating cuts.

The frame-like raised portions of the annular carbon disk explained in the foregoing are completely embedded in molding compound or are surrounded thereby. Not only does this ensure that the contact areas between the carbon segments and the conductor segments are optimally protected against aggressive media, especially in the case of peripherally closed construction of the frame-like raised portions, it also leads to automatic fixation of the carbon segments in the support body in peripheral direction and contributes to fixation of the carbon segments in the support body in radial direction.

If the electrically conductive connections of the carbon segments to the contact regions of the conductor segments are to be established by soldering, the annular carbon disk must be metallized beforehand, at least on the subsequent contact areas. Galvanic techniques known as such are suitable for this purpose. In this case the annular carbon disk is expediently metallized on its entire end face; and the frame-like raised portions are preferably made with open structure. According to a particular aspect of the present invention, however, metallization is preferably achieved by high-pressure compaction of metal particles, especially of Cu powder—which if necessary is silver-coated—or of Ag powder into the subsequent contact faces of the annular carbon disk, followed by sintering. This form of metallization of the annular carbon disk is preferably limited to the subsequent contact areas, which in turn are preferably bounded by peripherally closed frame-like raised portions.

According to a preferred improvement, the inventive flat commutator is provided with a central bore that exhibits a flared region extending from the running surface in axial direction over the depth of the separating cuts made between the carbon segments. In a particularly preferred embodiment, this flared region has conical shape. This reduces the danger of short-circuiting due to carbon and/or metal dust on the shaft on which the commutator is mounted. Nevertheless, the stiffness of the commutator is largely preserved by virtue of the conical geometry.

From the foregoing explanations of the present invention it is evident that it provides a flat commutator with heretofore unknown properties. In particular, the inventive flat commutator is distinguished by excellent quality due in particular to the high stability, and it can be produced at low costs and in particularly small dimensions. In addition, the carbon segments can be easily embedded by injection molding; and the injection-molding die can have particularly simple structure. Furthermore, the conductor blank can have continuous contours on both the inside and outside, and thus can be placed in a female mold.

Figure 2:
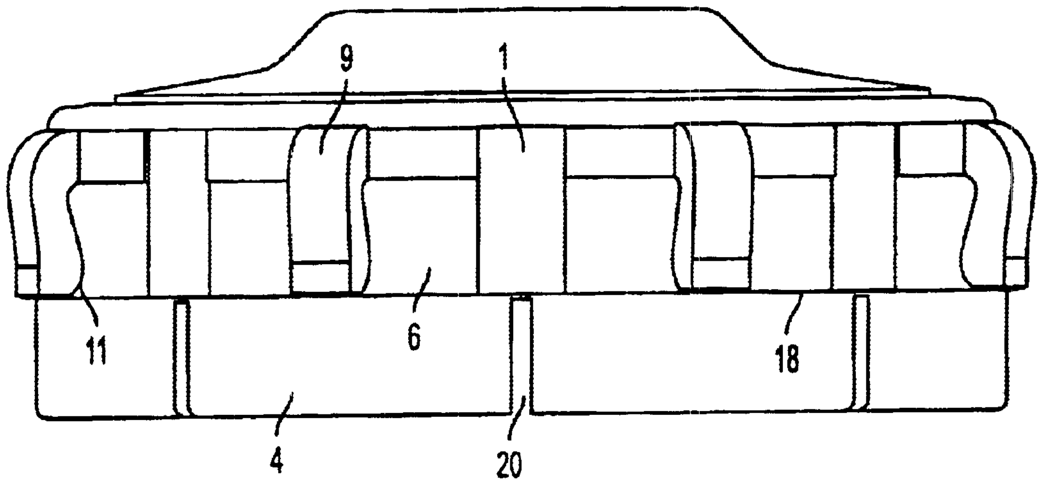
Figure 3:
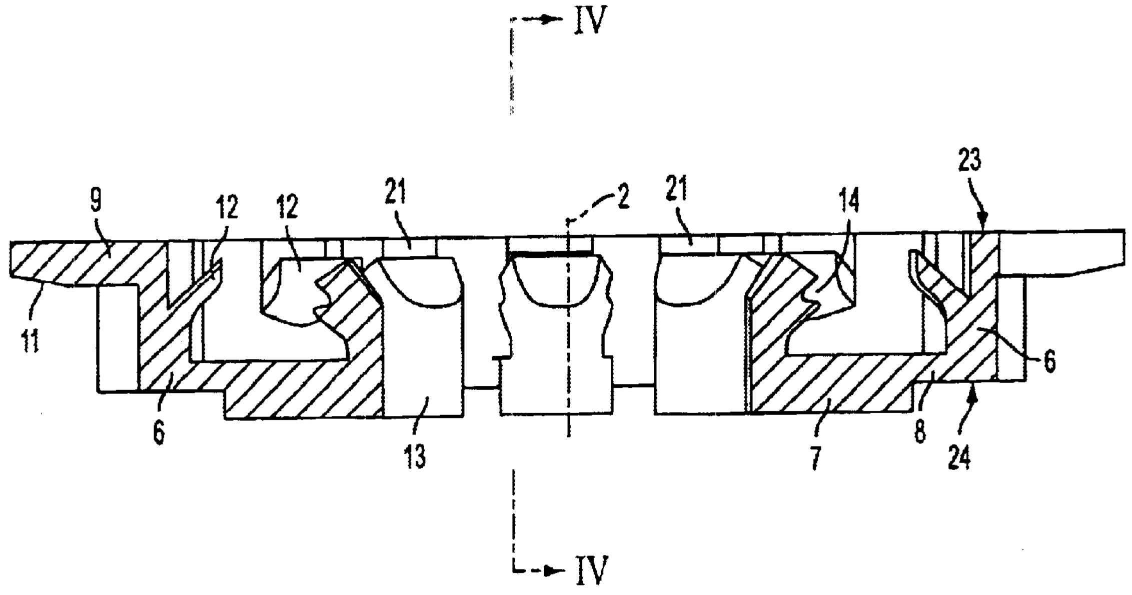
Figure 4:
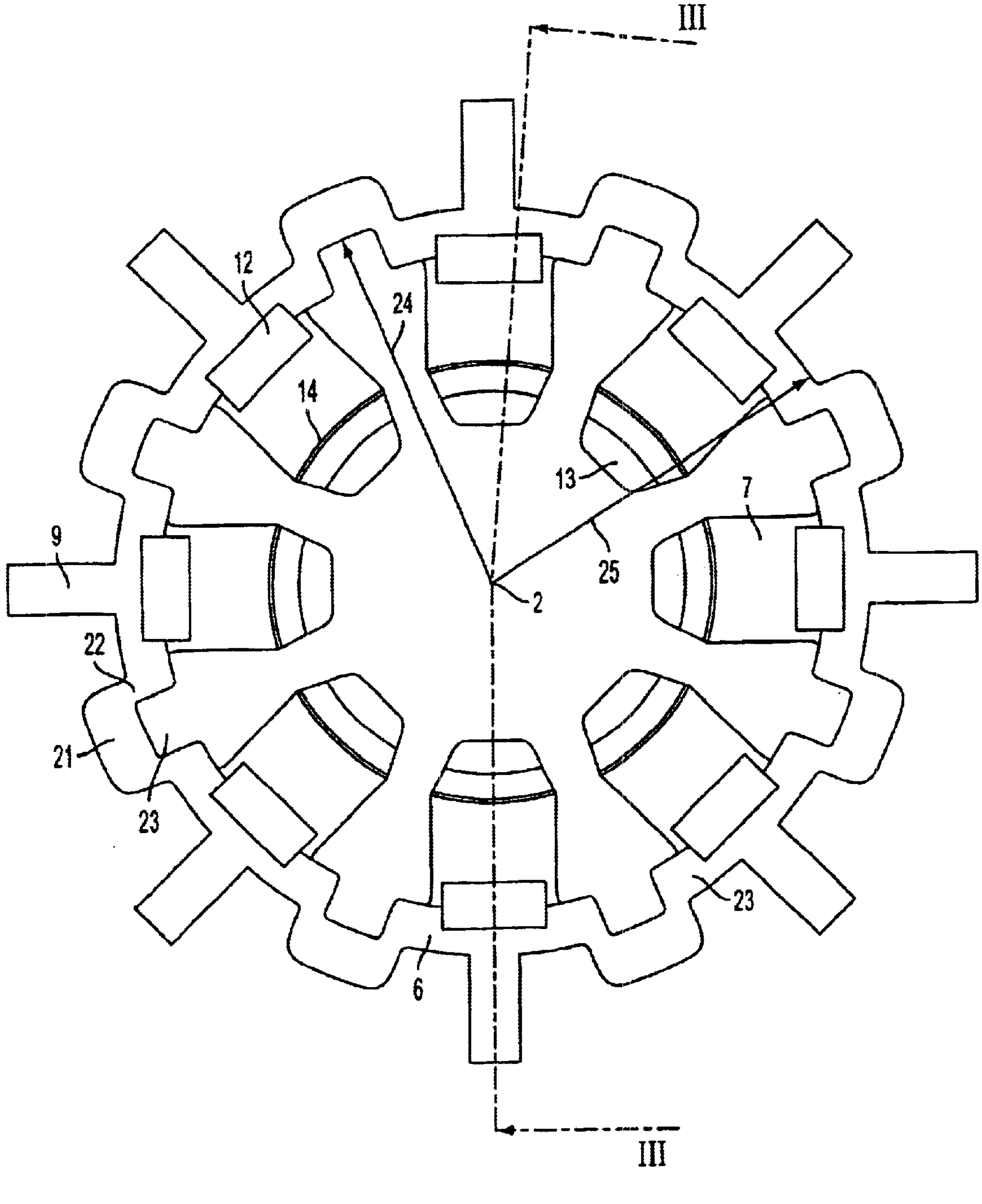
Figure 5:
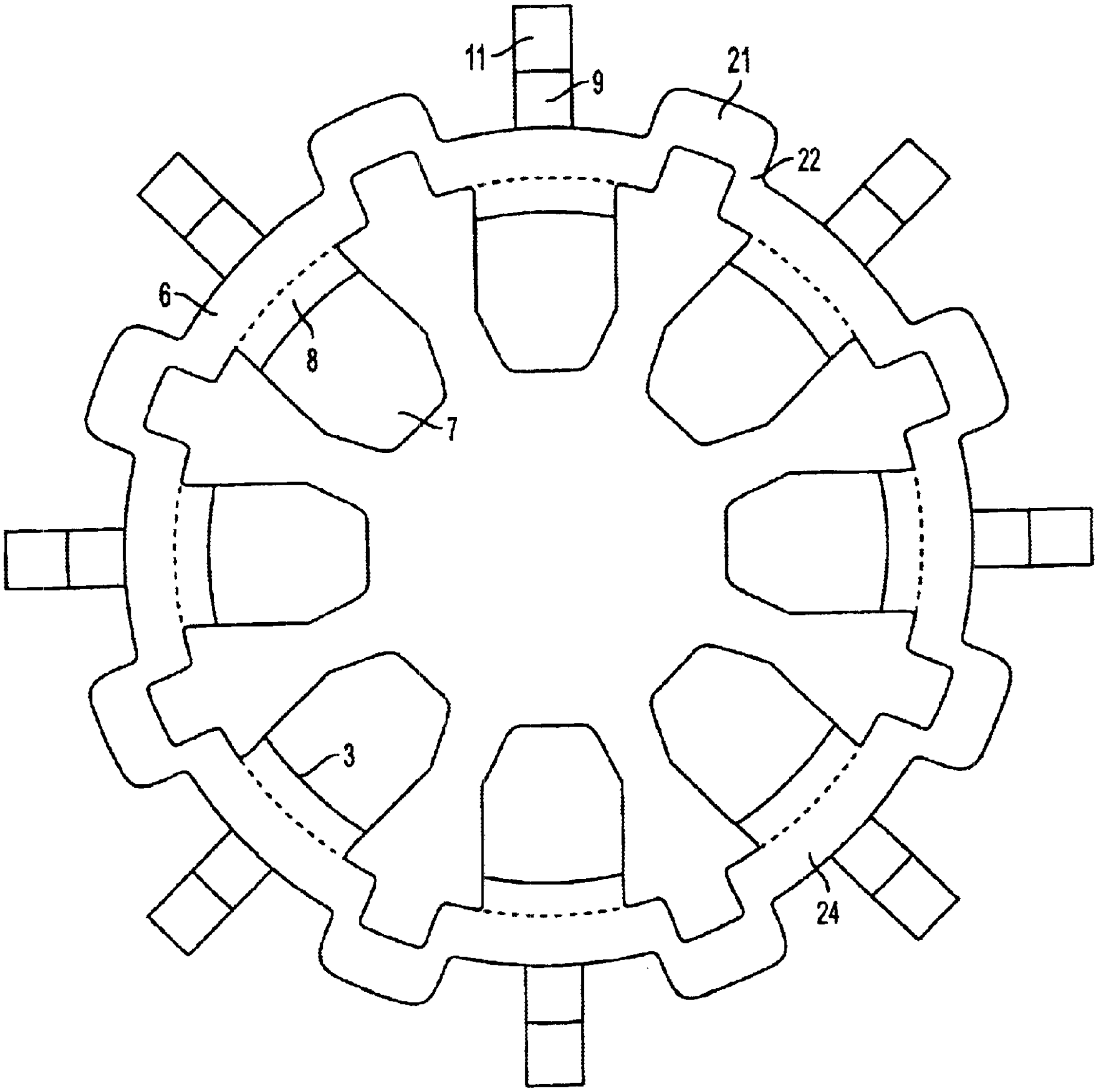
Figure 6:
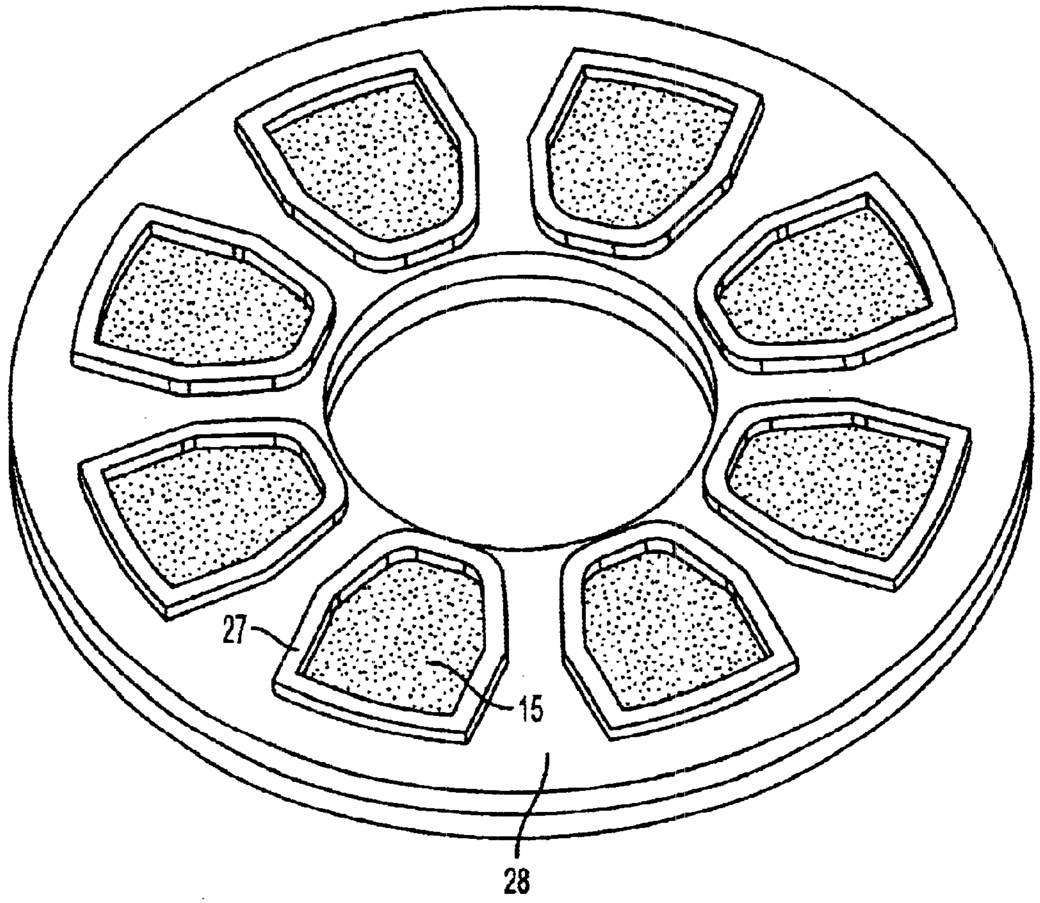
Figure 7:
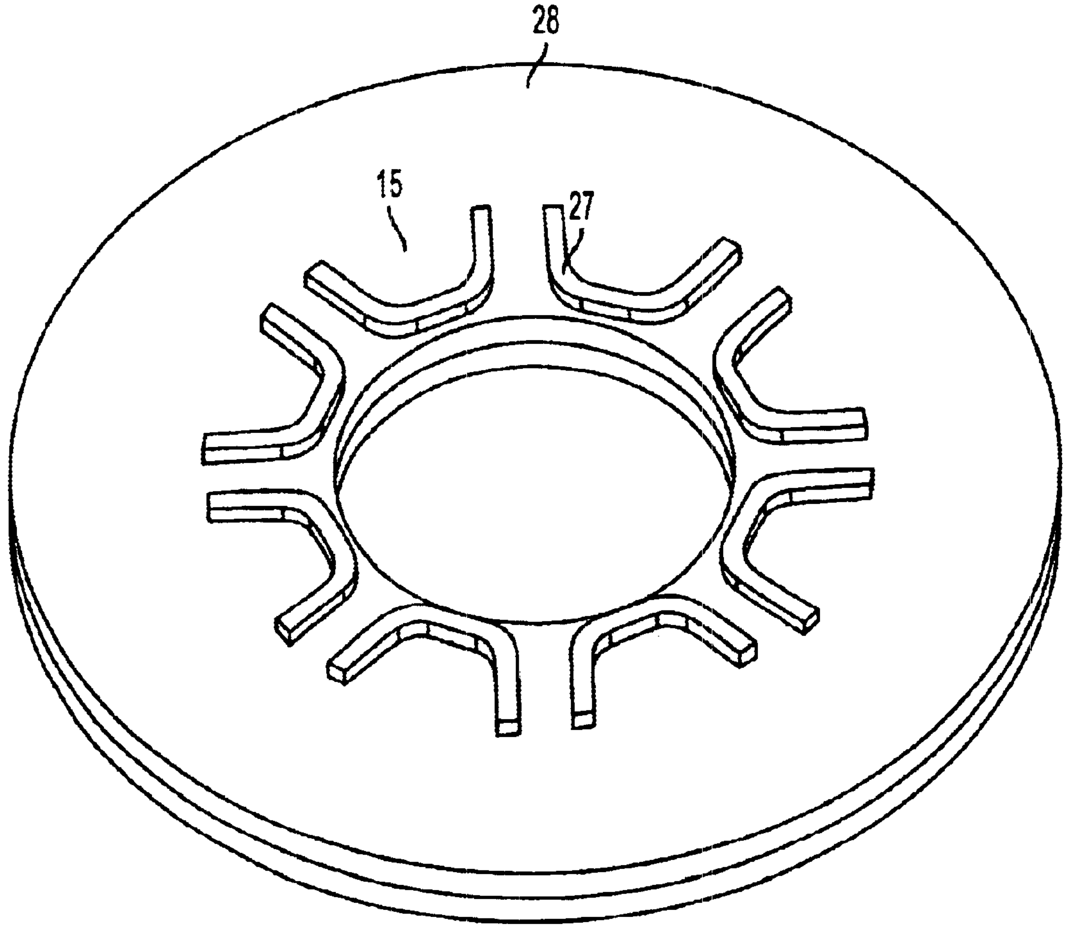
Figure 8:
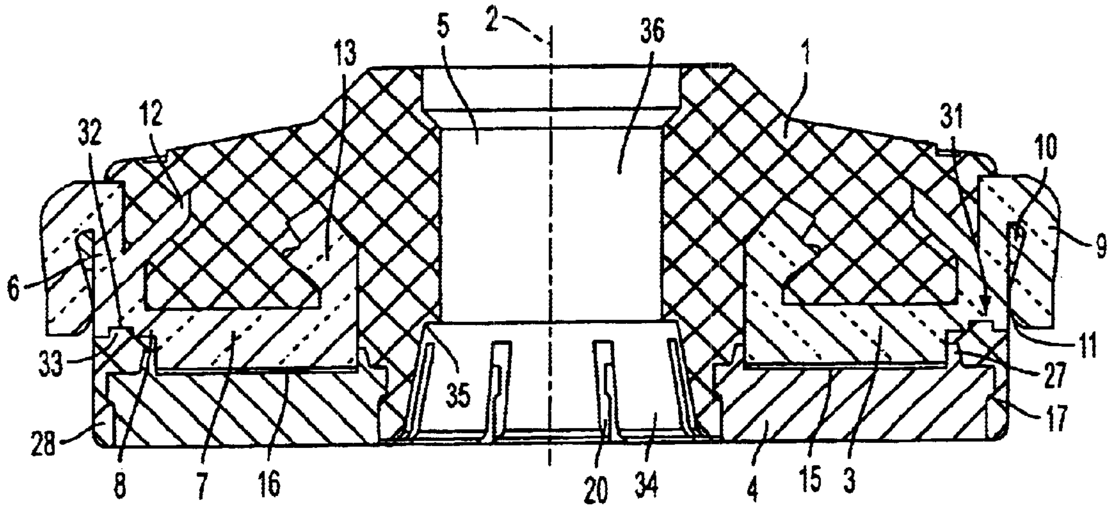
Figure 9:
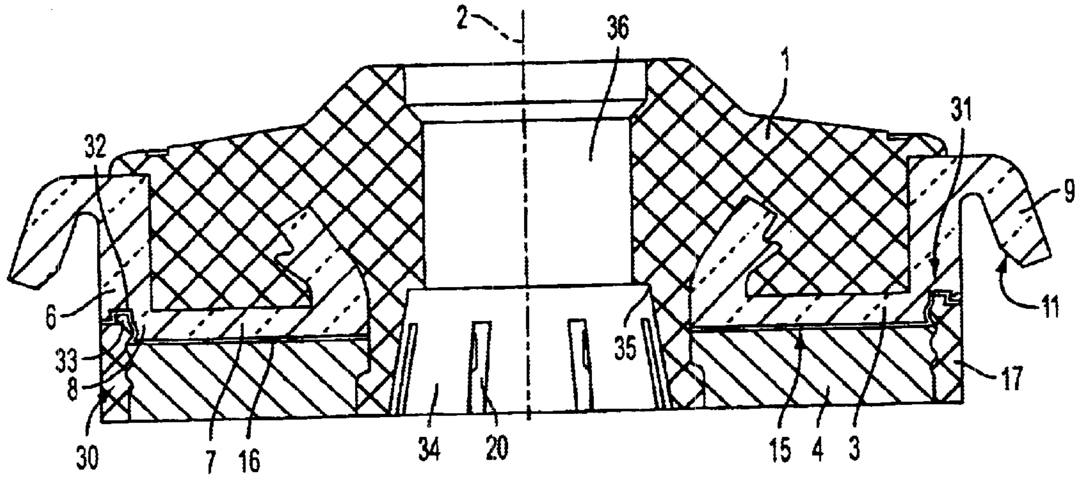
Figure 10:
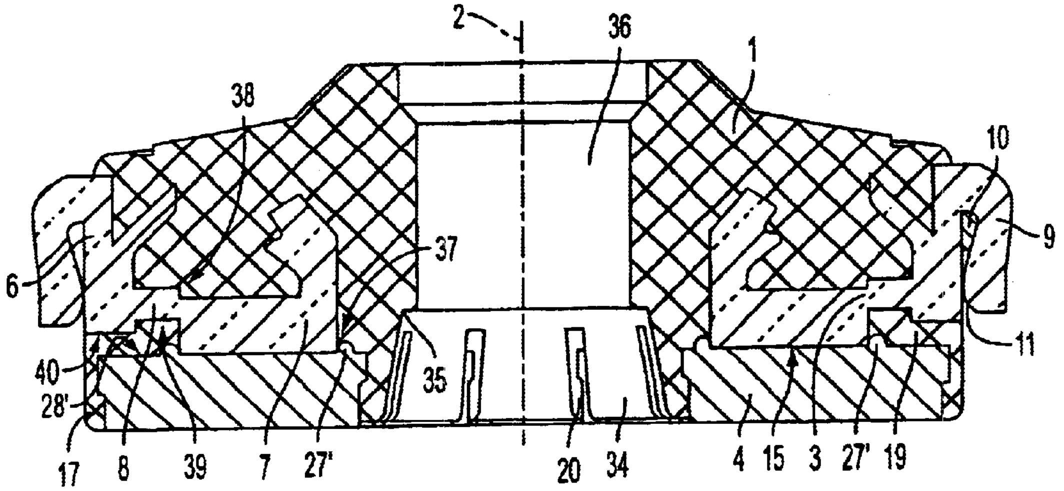
Figure 11:
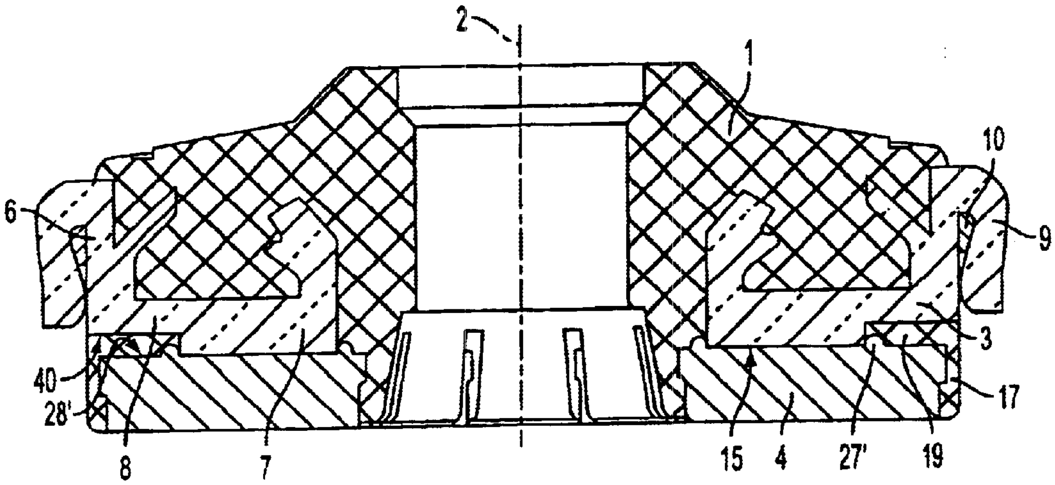
Figure 12:
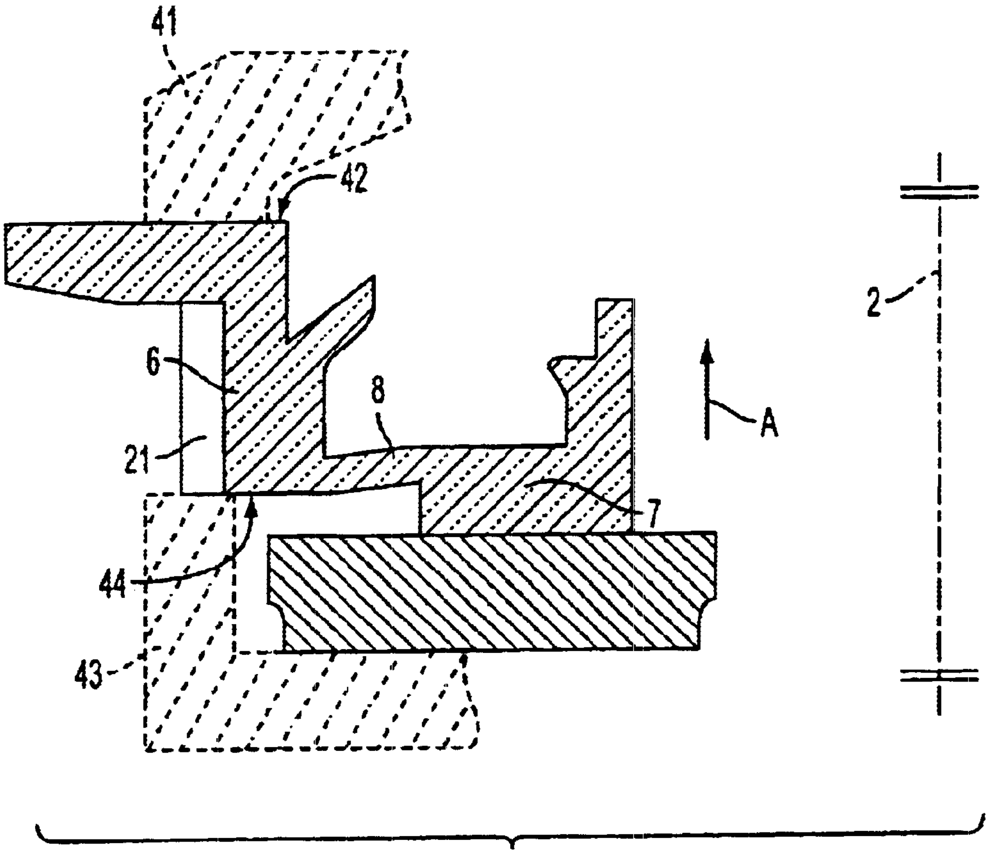
Figure 1:
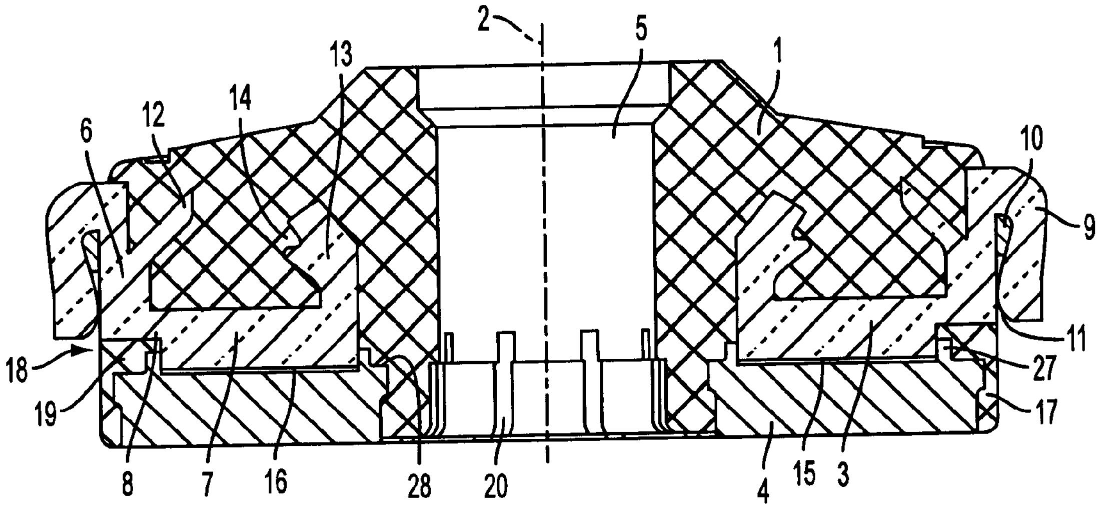
Figure 2:
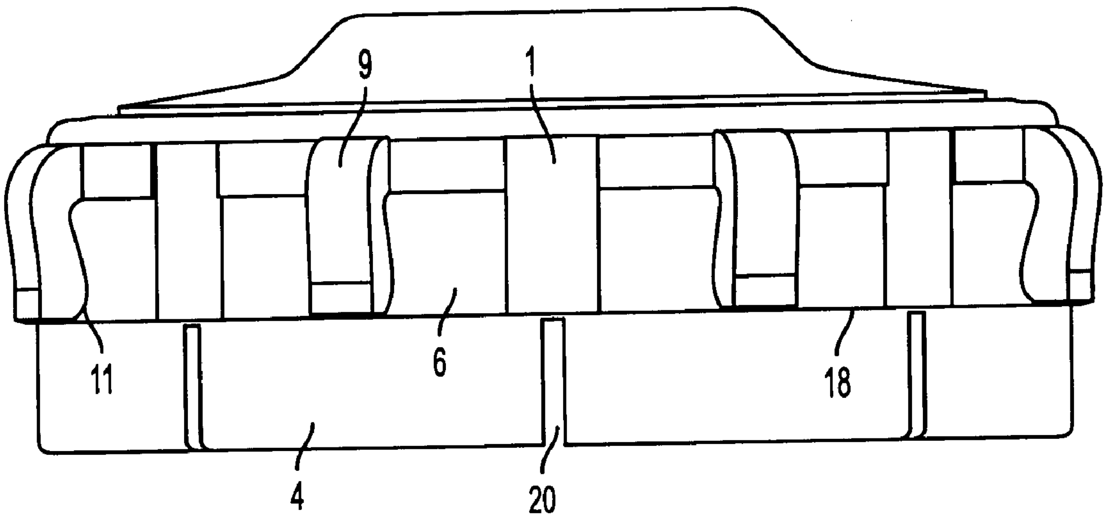
Figure 3:
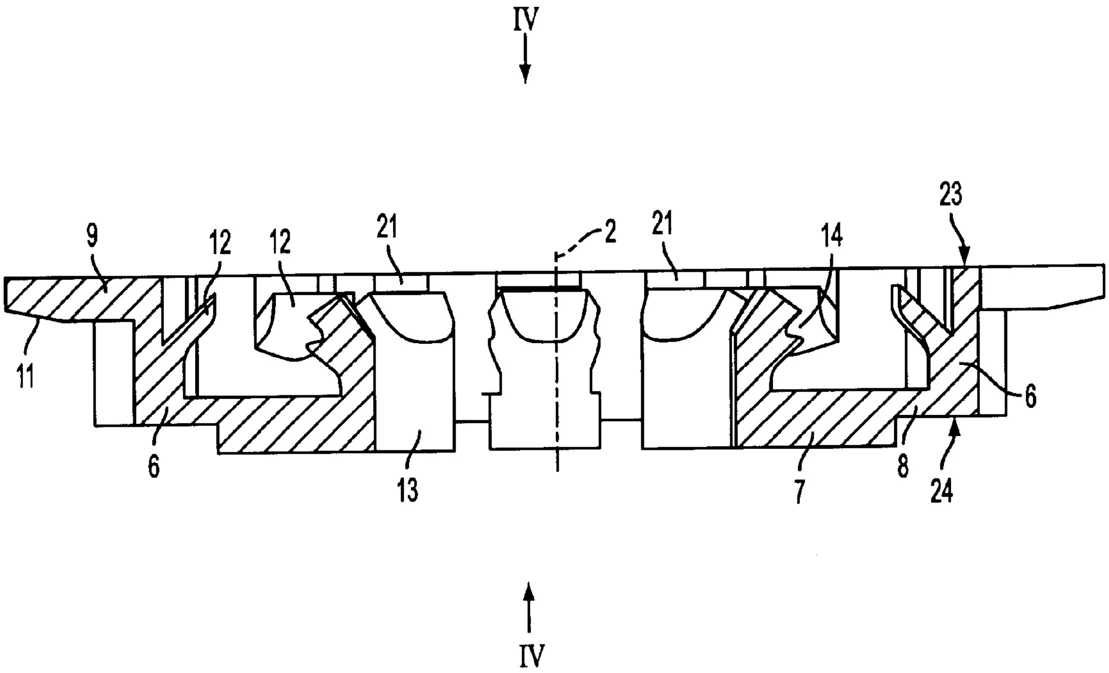
Figure 4:
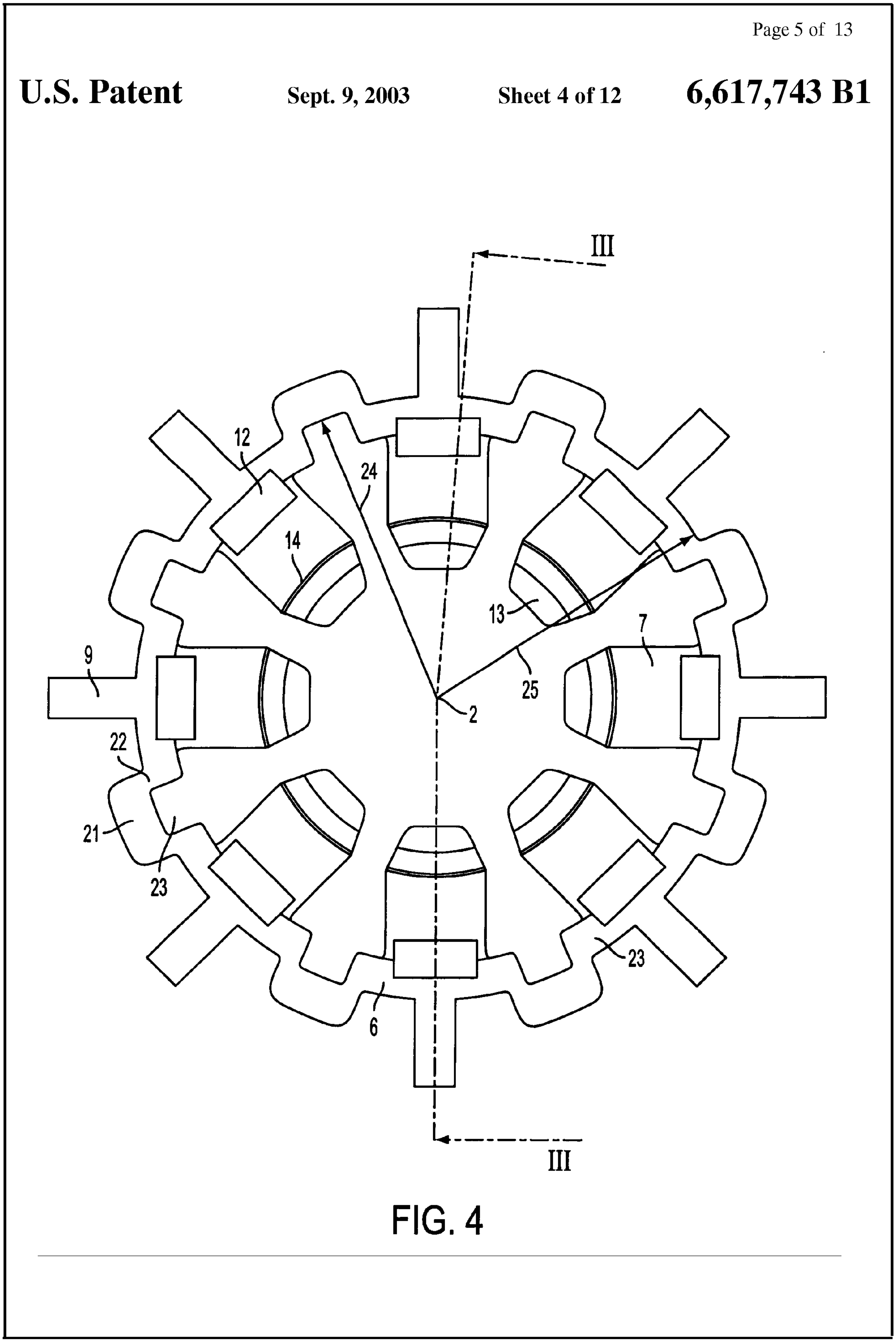
Figure 5:
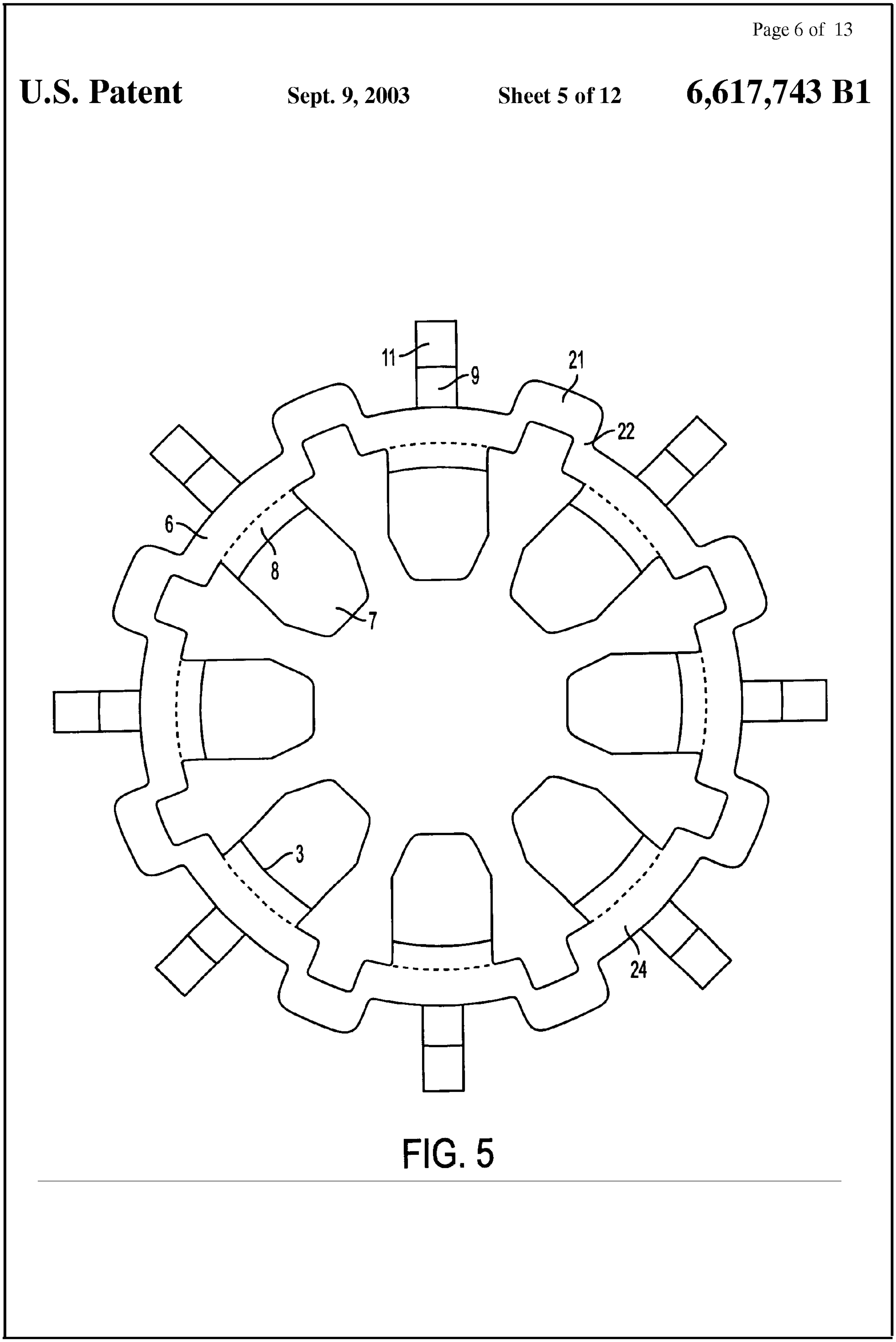
Figure 6:
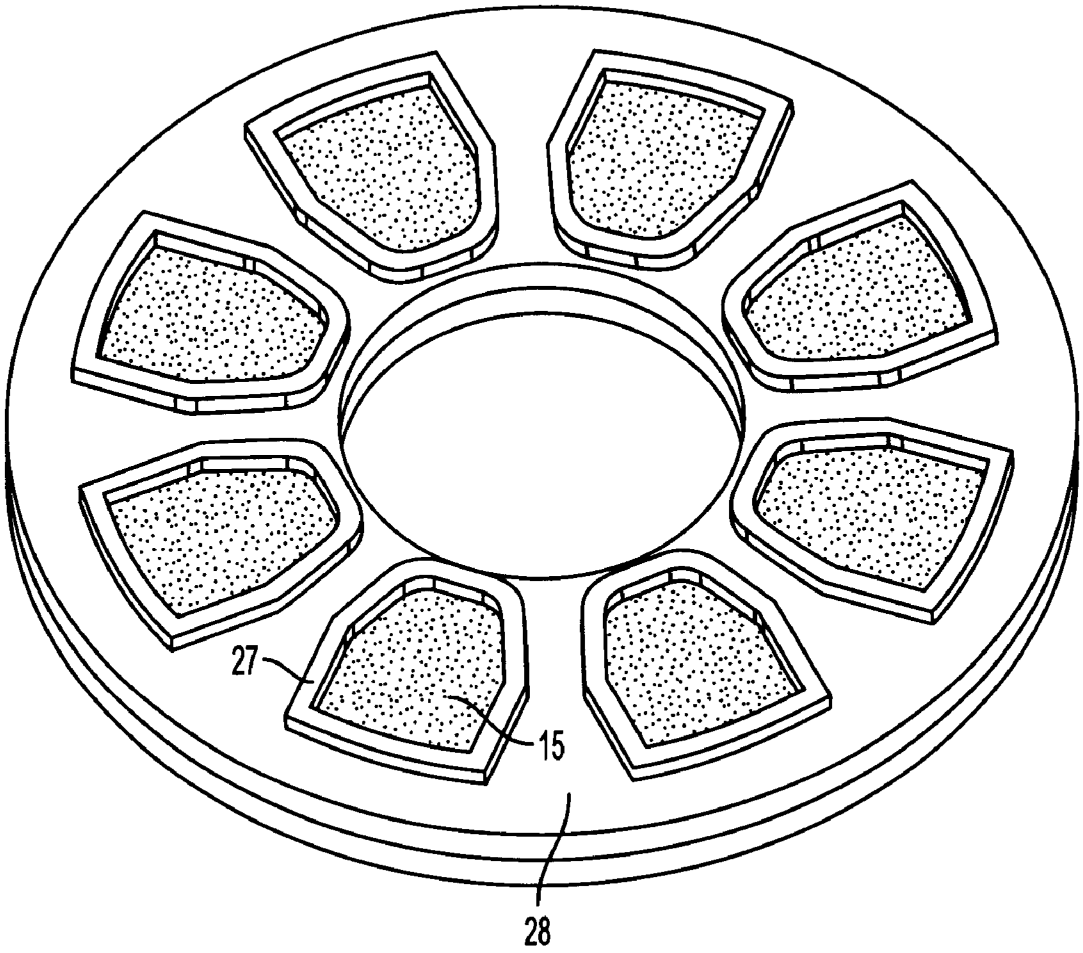
Figure 7:
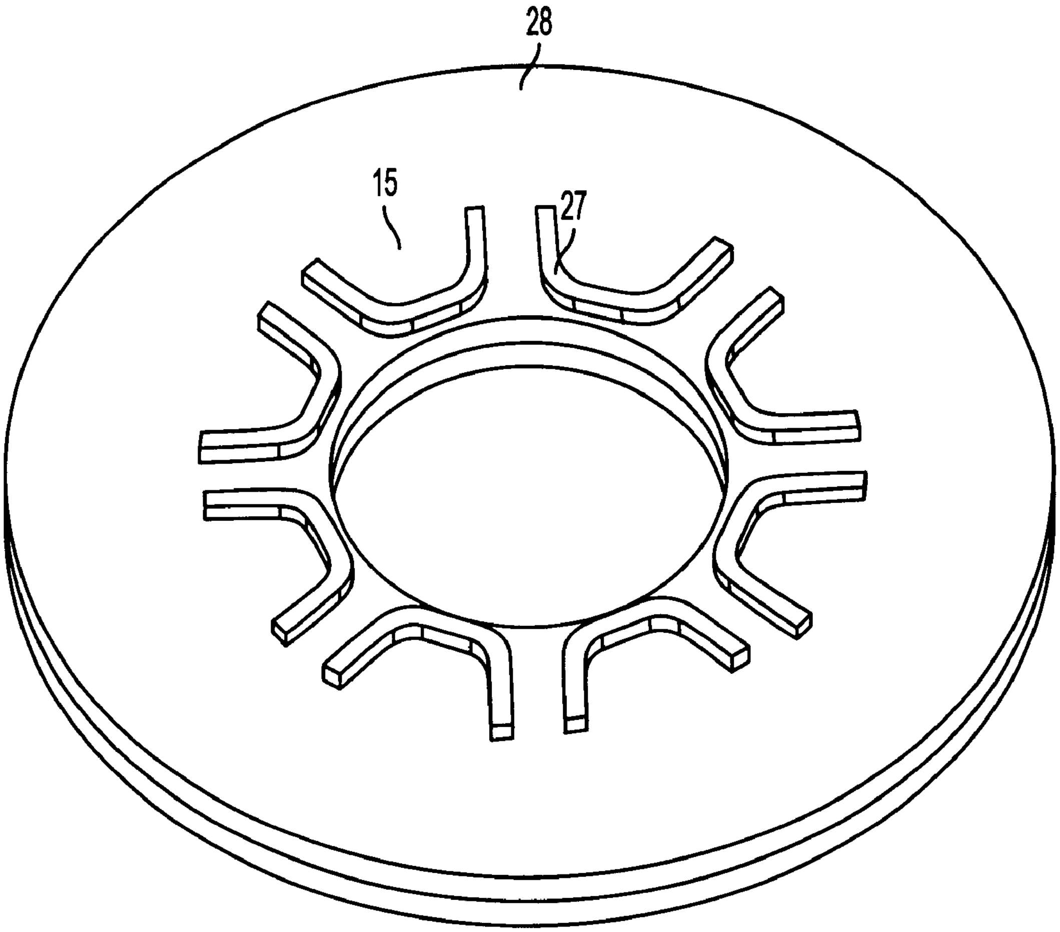
Figure 8:
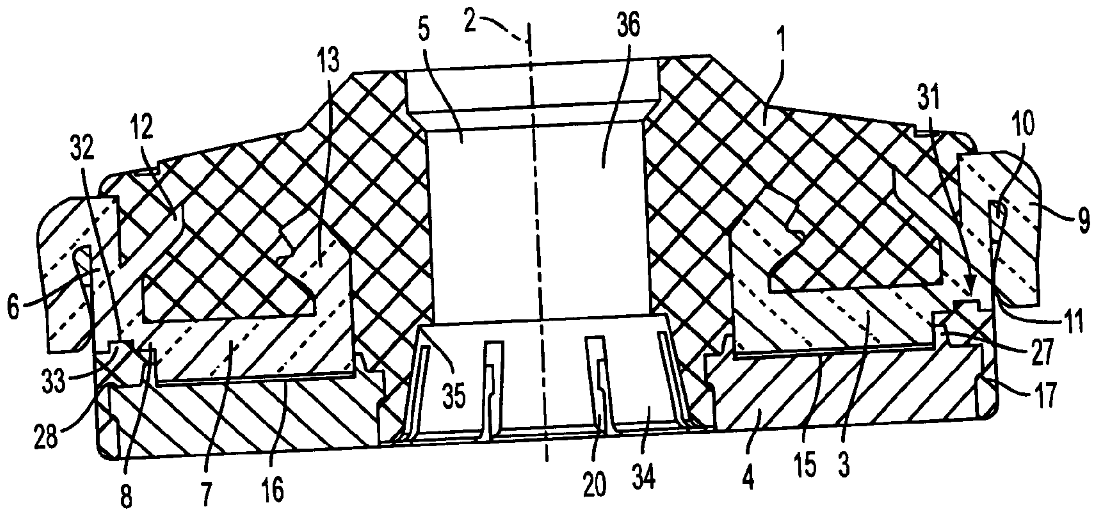
Figure 9:
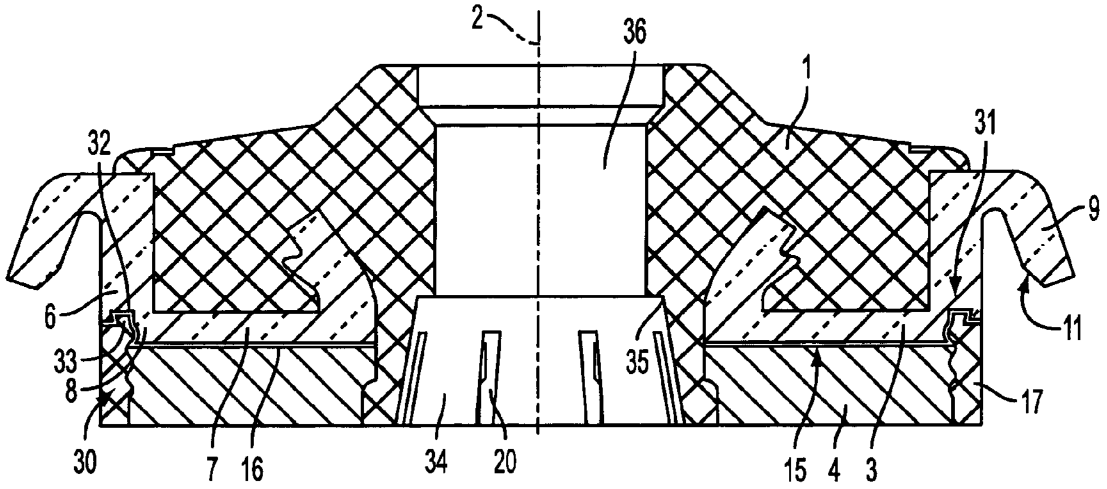
Figure 10:
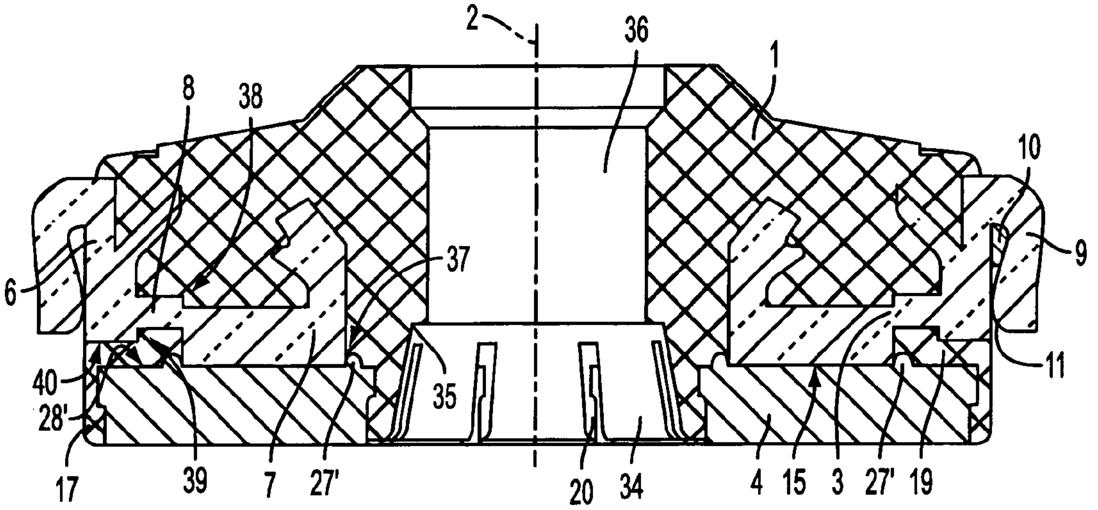
Figure 11:
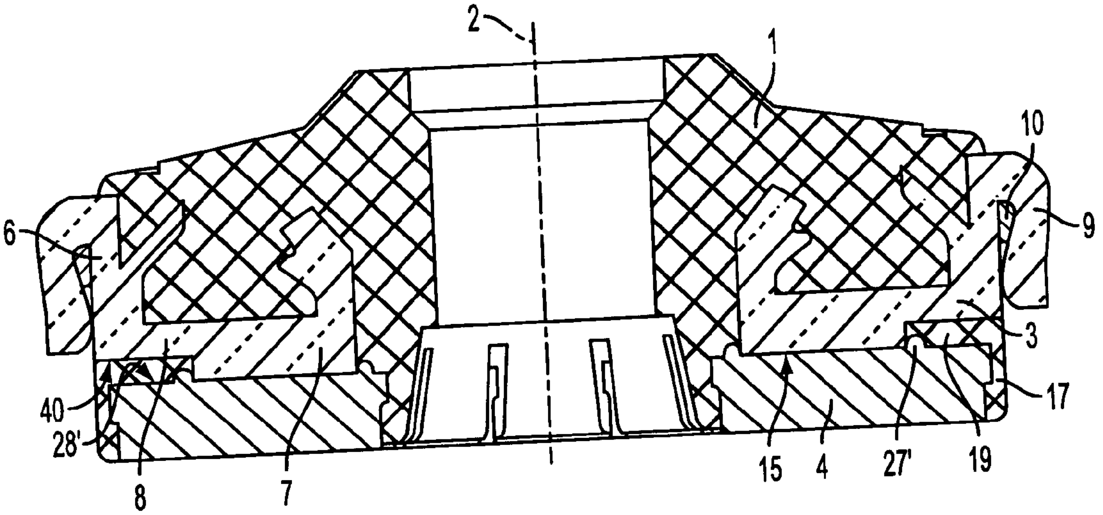
Figure 12:
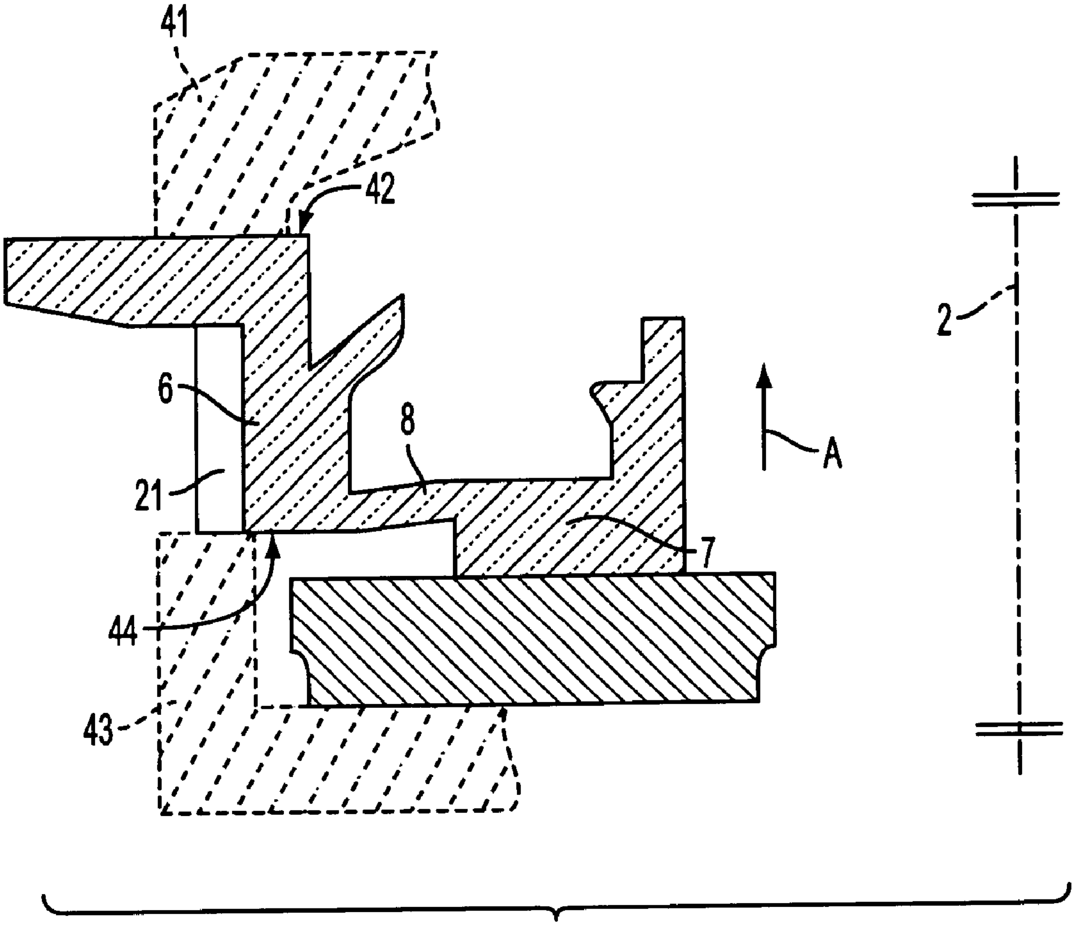

The present invention will be explained in more detail hereinafter on the basis of a preferred practical example illustrated in the drawing, wherein:

FIG. 1 shows an axial section through a flat commutator constructed according to the present invention, FIG. 2 shows a side view of the flat commutator according to FIG. 1, FIG. 3 shows an axial section through the conductor blank used for production of the flat commutator according to FIGS. 1 and 2, FIG. 4 shows a horizontal projection from above of the conductor blank according to FIG. 3 (arrow IV in FIG. 3), FIG. 5 shows a horizontal projection from below of the conductor blank according to FIGS. 3 and 4 (arrow V in FIG. 3), FIG. 6 shows a perspective view of the annular carbon disk used for production of the flat commutator according to FIGS. 1 and 2, FIG. 7 shows a second preferred embodiment of the annular carbon disk used for production of an inventive flat commutator, FIG. 8 shows an axial section through a further preferred embodiment of a flat commutator constructed according to the present invention, FIG. 9 shows an axial section through yet another preferred embodiment of a flat commutator constructed according to the present invention, FIG. 10 shows an axial section through a modification of the flat commutator illustrated in FIG. 8, FIG. 11 shows an axial section through a further modification of the flat commutator illustrated in FIG. 8, and FIG. 12 shows the axial yielding of the conductor blank during production of the flat commutator approximately corresponding to FIG. 11.

The flat commutator according to FIGS. 1 and 2 comprises a support body 1 made from insulating molding compound, eight conductor segments 3 disposed in uniform distribution around axis 2, and eight carbon segments 4, each of which is connected in electrically conductive relationship to a conductor segment 3. Support body 1 is provided with a central bore 5. To this extent the flat commutator according to FIGS. 1 and 2 corresponds to the widely used prior art, and so there is no need to explain the basic construction in detail.

As will be explained in detail hereinafter, conductor segments 3, which are made of copper, are derived from the conductor blank illustrated in FIGS. 3 to 5. They comprise three zones, namely terminal region 6, contact region 7 and transition region 8, which connects the two aforesaid regions to one another. On each of contact regions 6 there is disposed a contact lug 9. This is used for electrically conductive connection of a winding wire 10 to conductor segment 3 in question. Contact lugs 9 are provided at their end (see FIG. 3) with a chamfer 11, specifically on that face which points radially inward in the finished flat commutator and which is adjacent to the associated terminal region 6 of conductor segment 3 in question.

For better anchoring of conductor segments 3 in support body 1, an inwardly inclined retaining claw 12 projects from the terminal regions 6 of each conductor segment 3. Anchoring parts 13, which protrude from the contact regions in a direction substantially parallel to the axis, are provided for the same purpose at the radially inner ends of contact regions 7 of conductor segments 3. Anchoring parts 13 are provided at their radially outer peripheral faces with notches 14.

Of special importance for the present invention is the dimensioning of conductor segments 3 in their various portions. Whereas the thickness—measured in radial direction—of terminal regions 6 and the thickness—measured in axial direction—of contact regions 7 is large, transition regions 8 have particularly thin-walled structure. Transition regions 8 are attached to contact regions 7 at some distance from carbon segments 4, so that no contact exists between terminal regions 6 and transition regions 8 of conductor segments 3 on the one hand and carbon segments 4 on the other hand.

Contact regions 7 of conductor segments 3 bear with their entire surface against contact areas 15, which are disposed on the end faces of carbon segments 4. In the region of contact areas 15 an electrically conductive contact material 16 is accommodated between contact regions 7 of conductor segments 3 and carbon segments 4. Contact areas 15 are surrounded by frame-like raised portions 27 (see FIG. 6), which form a closed periphery and which project from end face 28 of carbon segments 4. The inner contour of frame-like raised portions 27 of carbon segments 4 is matched sealingly to the contour of contact regions 7 of conductor segments 3 in such a way that no molding compound can reach contact areas 15 during molding of support body 1.

Carbon segments 4 are each covered at their radially outer peripheral faces by a molding-compound jacket 17 of support body 1. These outer peripheral faces of carbon segments 4 have a stepped structure that ensures interlocking connection to the respective molding-compound jacket 17. Terminal regions 6 of conductor segments 3 extend slightly beyond the outer peripheral faces of molding-compound jacket 17 in radial direction, whereby a step 18 is formed on the outer periphery of the flat commutator.

The core of support body 1 also covers the radially inner peripheral faces of carbon segments 4. Here also an interlocking connection is provided by virtue of a stepped structure of the radially inner peripheral faces of carbon segments 4. The interlocking connections of carbon segments 4 to support body 1 in the region of their radially inner and outer peripheral faces ensures durable retention of the carbon segments in support body 1. Carbon segments 4 are engaged interlockingly in support body 1 in peripheral direction also, specifically via frame-like raised portions 27.

A final feature to be seen in FIG. 1 is molding-compound layer 19, which is provided between terminal regions 6 and transition regions 8 of conductor segments 3 and the associated carbon segments 4. The thickness of each molding-compound layer 19 depends in particular on the ratio of the thicknesses of transition regions 8 and of contact regions 7 of conductor segments 3 relative to one another.

Also illustrated are radial cuts 20, with which an originally one-piece annular carbon disk (see FIGS. 6 and 7) was subdivided into individual carbon segments 4 during production of the flat commutator.

FIG. 2 illustrates the particularly large-size outer peripheral face of terminal regions 6 of conductor segments 3. Two relatively large zones for contact with welding electrodes during welding of winding wire 10 to the conductor segment in question are available on both sides of contact lugs 9.

FIGS. 3 to 5 illustrate in section, as a horizontal projection from above and a horizontal projection from below, the conductor blank used for production of the flat commutator according to FIGS. 1 and 2. Many details of the conductor blank are immediately obvious from the foregoing explanation of FIGS. 1 and 2; the foregoing descriptions are applicable in this regard. An important feature of the conductor blank is its tubular geometry with completely closed periphery. Between each two terminal regions 6 there is provided a bridging part 21. Bridging parts 21 and terminal regions 6 of conductor segments 3 have the same axial extent and, via connecting webs 22, are connected to one another along their entire axial extent. Hereby closed annular faces 23 and 24, composed alternately of the end faces of terminal regions 6 of conductor segments 3 and of bridging parts 21, are formed on both end faces of the conductor blank. As explained hereinabove, this is particularly advantageous for tight sealing of the molding die against the conductor blank, because the large closing forces necessary in view of the extremely high injection-molding pressures do not lead to harmful deformation of the conductor blank.

Connecting webs 22—by virtue of appropriate dimensioning of grooves 23—have extremely thin-walled structure. This ensures that bridging parts 21 can be removed by knocking off in axial direction in a single working step after support body 1 has been injection-molded. Incidentally, it is provided for this purpose that the distance 24 of the radially inner peripheral faces of bridging parts 21 from commutator axis 2 is not smaller than but is equal to or, in a particularly preferred embodiment, is minimally larger than distance 25 of the radially outer peripheral faces of terminal regions 6 of conductor segments 3 from commutator axis 2.

In FIG. 6, which illustrates the annular carbon disk used for production of the flat commutator according to FIGS. 1 and 2, the shape of frame-like raised portions 27, which are provided on the end faces and which surround contact areas 15, can be clearly discerned. Compared with FIG. 5 it is also clear that the inner contour of frame-like raised portions 27 is matched to the outer contour of contact regions 7 of conductor segments 3.

Also evident in FIG. 6 is the profiled outer and inner peripheral face of the annular carbon disk, which is used for interlocking connection of subsequent carbon segments 4 to the molding compound of support body 1 in the region of the core or of the respective molding-compound jacket 17.

Contact areas 15 were metallized by pressing metal powder into the surface and then sintering.

The annular carbon disk illustrated in FIG. 7 differs from that according to FIG. 6 by the fact that frame-like raised portions 27 do not form closed peripheries but instead are open. Thus they surround contact areas 15 only partly; correspondingly, they also surround contact regions 7 of conductor segments 3 only partly in the finished flat commutator. This is sufficient for reliable adjustment of the conductor blank and annular carbon disk relative to one another during production of the flat commutator.

The entire end face of the annular carbon disk was metallized by galvanization.

FIG. 8 illustrates a further flat commutator constructed according to the present invention and differing from the flat commutator according to FIG. 1 by the features indicated below:

A first difference between the flat commutator according to FIG. 8 and that according to FIG. 1 relates to the anchoring of molding-compound jacket 17 of support body 1 together with terminal regions 6 of conductor segments 3 by means of a toothed engagement 31. This is formed by an axial groove 32 extending in peripheral direction in terminal regions 6 of the conductor segments and by a molding-compound rib 33 engaging in this groove. Also evident is the undercut structure of groove 32, established by compression of the outer annular boundary of the groove during closing of the injection-molding die in which support body 1 was molded.

Incidentally, comparison of FIGS. 8 and 1 with one another shows that the flat commutator according to FIG. 8 is provided with a differently shaped central bore 5, since in this case bore 5 has a conically flared portion 34, which adjoins cylindrical portion 36 of the bore via a step 35. Separating cuts 20, by means of which the annular carbon disk is subdivided into individual carbon segments 4, open into flared region 34 of central bore 5.

Carbon segments 4 are metallized only in the region of contact areas 15 surrounded by frame-like raised portions 27, specifically by pressing metal powder into the surface of the annular carbon disk and then sintering. The carbon segments are connected to the conductor segments in electrically conductive relationship by soft-soldering.

In all other respects the flat commutator illustrated in FIG. 8 corresponds to that according to FIG. 1, and so, to avoid repetition, the corresponding descriptions are not given.

As regards the shape of central bore 5, the flat commutator illustrated in FIG. 9 corresponds to the flat commutator according to FIG. 8. Incidentally, toothed engagement 31 of molding-compound jacket 17 with terminal regions 6 of conductor segments 3 is again provided here.

An important feature of the flat commutator according to FIG. 9 is that contact regions 3 of conductor segments 3 are soldered with their entire surface to carbon segments 4. In contrast to the situation for the embodiments explained in the foregoing, the contact areas here are not bounded by frame-like raised portions. Carbon segments 4 bear with their entire end faces against contact regions 7 of conductor segments 3. The annular carbon disk from which carbon segments 4 were derived was completely metallized on its end face. What must also be pointed out is the interlocking connection of molding-compound jacket 17 of support body 1 to the outer peripheral faces of carbon segments 4 by a corrugated structure 30. This was produced by radial turning with the lathe and at the same time removing excess solder after the annular carbon disk had been soldered onto the conductor blank.

Otherwise it is clearly evident in FIG. 9 that it is by no means absolutely necessary for transition regions 8 of conductor segments 3 to be radially oriented as illustrated in FIGS. 1 and 8. To the contrary, it is also entirely possible for transition regions 8 of conductor segments 3 to be axially oriented. The only consideration of importance is that their cross-sectional area—oriented perpendicular to the heat-flow direction—be so small that an effective heat-flow resistance is formed between terminal region 6 and contact region 7 of the respective conductor segment 3.

As regards its basic geometric features, the flat commutator illustrated in FIG. 10 corresponds to the flat commutator according to FIG. 8. To avoid repetitions, therefore, the descriptions of FIG. 8 are invoked in connection with the basic construction of the flat commutator illustrated in FIG. 10, and only the differences will be discussed below. In the first place, frame-like raised portions 27' surrounding contact areas 15 have semicircular cross section. Not only does this facilitate joining of the conductor blank together with the annular carbon disk during production of the flat commutator, but also a further advantage of this shape of frame-like raised portions 27' is that molding compound penetrates into wedge-shaped regions 37 between the peripheral faces of contact regions 7 of conductor segments 3 and adjoining frame-like raised portions 27'. This favors firm connection of carbon segments 4 to contact regions 7 of conductor segments 3. Another favorable feature is that frame-like raised portions 27' are completely covered by the molding compound of the support body.

A further difference between the flat commutator according to FIG. 10 and the flat commutator illustrated in FIG. 8 is the larger radial extent of transition regions 8 of conductor segments 3. If the finished flat commutator has an outside diameter of about 20 mm, the radial extent of transition regions 8 is approximately 1 mm. These transition regions are radially oriented; their wall thickness—determined in axial direction—is approximately 0.7 mm, while the wall thickness of terminal regions 6—determined in radial direction—is about 1.2 mm and the wall thickness of contact regions 7—determined in axial direction—is about 1.4 mm. Because of step 38, the cross section via which each transition region 8 is attached to the associated contact region 7 is only about 0.5 mm high, thus having the effect of decreasing the heat flow from terminal regions 6 via transition regions 8 to contact regions 7.

Finally, in contrast to the situation for the flat commutator according to FIG. 8, it is evident that an axial groove is not machined into terminal regions 6 of conductor segments 3. Nevertheless, transition regions 8 are offset relative to end-face edges 40 of terminal regions 6 of conductor segments 3 by formation of a step 39. By virtue of the wall thickness of terminal regions 6 and of the radial extent of transition regions 8 of conductor segments 3, a considerable distance (about 1.8 mm in the present case) is established between the radial outer face of carbon segments 4 on the one hand and the radial outer face of contact regions 7 of conductor segments 3 on the other hand. Hereby a relatively large end face 28' of carbon segments 4, via which these are connected to support body 1, is formed radially outside frame-like raised portions 27'. In total, areas corresponding to approximately 50 to 70% of the running faces of carbon segments 4 are connected to the molding compound of support body 1 via end faces 28' as well as raised portions 27'.

As regards its essential geometric features, the flat commutator according to FIG. 11 corresponds to that of FIG. 10. This is also true for the shape of frame-like raised portions 27', for the size of contact areas 15 and for the wall thicknesses of terminal regions 6, transition regions 8 and contact regions 7 of conductor segments 3. On the other hand, transition regions 8 of conductor segments 3 in this case adjoin end faces 40 of terminal regions 6 in flush relationship, and so steps 38 and 39 illustrated in FIG. 10 are no longer present.

FIG. 12 illustrates the conditions during manufacture of the flat commutator shown in FIG. 11, or in other words for a composite part comprising a conductor blank and an annular carbon disk joined thereto when it is placed in an injection-molding die. Upper half 41 of the injection-molding die bears against a sealing face 42, which is formed by the upper end faces of contact regions 6, of bridging parts 21 and of connecting webs 22 (see FIG. 4). Lower half 43 of the injection-molding die bears correspondingly against a sealing face 44, formed by the lower end face of terminal regions 6, of bridging parts 21 and of connecting webs 22. FIG. 12 shows that possible thickness tolerances of the annular carbon disk can be compensated for by axial yielding (arrow A) of contact regions 7 of the conductor blank relative to terminal regions 6 through deformation of transition regions 8. Thus thickness tolerances of the annular carbon disk do not influence the finished size of the finished flat commutator. Regardless of possible deviations of the size of the annular carbon disk from its specified value, therefore, the dimensions of the finished flat commutator are determined exclusively by the injection-molding die. Consequently the finished flat commutator is provided with exactly its specified dimensions even without costly subsequent machining of the end faces.

What is claimed is:

1. A flat commutator for an electrical machine, comprising a support body made of an insulating molding compound, a plurality of conductor segments and an equal number of carbon segments, which are disposed at the ends and are connected in electrically conductive relationship to the conductor segments, wherein each of the conductor segments is provided with a thick-walled terminal region disposed on the periphery of the support body, a contact region, which is also thick-walled, disposed between the support body and the associated carbon segment and a thin-walled transition region disposed between the terminal region and the contact region, wherein the uniformly thin-wailed transition regions of the conductor segments are oriented with substantially radial extent relative to the commutator axis and are attached to the contact regions of the conductor segments at some distance from the carbon segments, a molding-compound layer being disposed in each case between the transition regions of the conductor segments on the one hand and the carbon segments on the other hand.

2. A flat commutator according to claim 1, wherein the wall thickness of the transition regions of the conductor segments is less than 60% of the wall thickness of the contact regions.

3. A flat commutator according to claim 1, wherein the terminal regions extend over at least 65% of the periphery of the flat commutator.

4. A flat commutator according to claim 1, wherein the molding-compound layer extends in the region between the terminal regions and the carbon segments.

5. A flat commutator according to claim 1, wherein the axial thickness of the molding-compound layer is at least 0.5 mm.

6. A flat commutator according to claim 1, wherein the radial outer faces of the contact regions are disposed radially inside the radial outer faces of the carbon segments by an amount that ranges between 0.5 and 1.5 times the axial thickness of the carbon segments.

7. A flat commutator according to claim 1, wherein the radial inner faces of the contact regions are disposed radially outside the radial inner faces of the carbon segments by an amount that ranges between 0.25 and 1.0 times the axial thickness of the carbon segments.

8. A flat commutator according to claim 1, wherein contact lugs chamfered at the end are disposed on the terminal regions, with the chamfers facing the peripheral faces of the terminal regions.

9. A flat commutator according to claim 1, wherein the wall thickness of the contact regions of the conductor segments is at least 0.4 times the extent of the contact regions in peripheral direction.

10. A flat commutator according to claim 1, wherein the contact regions of the conductor segments bear in electrically conductive relationship over their entire surface against the contact areas disposed on the end faces of the carbon segments.

11. A flat commutator according to claim 10, wherein the contact areas are surrounded at least partly by frame-like raised portions projecting from the end face of the carbon segments.

12. A flat commutator according to claim 11, wherein the area of connection of the carbon segments to the support body in the region of the end faces of the carbon segments and of the raised portions facing away from the running surfaces corresponds to 50 to 70% of the running surface of the carbon segments.

13. A flat commutator according to claim 1, wherein the extent of the transition regions of the conductor segments in the peripheral direction is not greater than the extent of the contact regions in the peripheral direction.

14. A flat commutator according to claim 10, wherein an electrically conductive contact material is accommodated in the region of the contact areas between the contact regions of the conductor segments and the carbon segments.

15. A flat commutator according to claim 1, wherein each carbon segment is covered at its radially outer peripheral face by a molding-compound jacket of the support body.

16. A flat commutator according to claim 15, wherein the terminal regions of the conductor segments are provided with an axial groove which extends at least partly in peripheral direction and in which there engages a rib of the molding-compound jacket.

17. A flat commutator according to claim 15, wherein the terminal regions of the conductor segments project radially beyond the outer peripheral faces of the molding-compound jacket.

18. A flat commutator according to claim 15, wherein interlocking connections are provided in each case between the outer peripheral faces of the carbon segments and the molding-compound jackets.

19. A flat commutator according to claim 18, wherein the interlocking connection is formed as a corrugated structure.

20. A flat commutator according to claim 1, wherein the support body covers the radially inner peripheral faces of the carbon segments while forming interlocking connections.

21. A flat commutator according to claim 1, wherein the carbon segments are made with stepped structure on their outer peripheral edges facing the conductor segments.

22. A conductor blank for use in the flat commutator of claim 1, comprising a plurality of conductor segments, which are disposed around an axis, each of which is provided with a thick-walled terminal region disposed at the periphery of the conductor blank, with a contact region, which is also thick-walled, disposed at the end faces, and with a thin-walled transition region disposed between the terminal region and the contact region, wherein each of the two conductor segments are connected to one another via a bridging part and in that the uniformly thin transition regions of the conductor segments are oriented with substantially radial extent relative to the axis and are attached to the contact regions at some distance from the end faces thereof.

23. A conductor blank according to claim 22, wherein the bridging parts are disposed between the terminal regions of two neighboring conductor segments.

24. A conductor blank according to claim 23, wherein the bridging parts and the terminal regions of the conductor segments have the same axial extent and, via connecting webs, are connected to one another along their entire axial extent.

25. A conductor blank according to claim 24, wherein the wall thickness of the connecting webs is considerably smaller than the wall thickness of the bridging parts.

26. A conductor blank according to claim 23, wherein the distance of the radially inner peripheral faces of the bridging parts from the commutator axis is at least equal to or slightly larger than the distance of the radially outer peripheral faces of the terminal regions of the conductor segments from the commutator axis.

27. A conductor blank according to claim 22, wherein anchoring parts, which protrude from the contact regions in a direction substantially parallel to the axis, are provided at the radially inner ends of the contact regions of the conductor segments.

28. A conductor blank according to claim 27, wherein the anchoring parts are provided at their radially outer peripheral faces with notches.

29. A conductor blank according to claim 22, wherein the extent of the transition regions of the conductor segments in peripheral direction is not greater than the extent of the contact regions in peripheral direction.

30. An annular carbon disk for use in the production of a flat commutator according to claim 1, wherein there is provided, on an end face, a plurality of completely or partly closed frame-like raised portions, which project from the end face of the annular carbon disk and surround contact areas.

31. An annular carbon disk according to claim 30, wherein the frame-like raised portions have a closed periphery, wherein there is provided a solderable metal layer, which is confined to the contact areas and which comprises metal particles pressed into the annular carbon disk and then sintered.

32. An annular carbon disk according to claim 30, wherein the frame-like raised portions have open structure, wherein the end face of the annular carbon disk is provided over its entire surface with metallization formed by galvanization.

33. A method for production of a flat commutator according to claim 1, comprising the following steps:

production of a conductor blank comprising a plurality of conductor segments, each two of which are connected to one another via a bridging part, wherein the conductor segments are each provided with a thick-walled terminal region disposed at the periphery of the conductor blank, with a contact region, which is also thick-walled, disposed at the end faces, and with a thin-walled transition region disposed between the terminal region and the contact region;

production of an annular carbon disk, which is provided, on an end face, with a number of frame-like raised portions corresponding to number of conductor segments of the conductor blank;

joining the conductor blank together with the annular carbon disk, such that the contact regions of the conductor segments bear against the contact areas surrounded by the frame-like raised portions to establish electrically conductive connections;

placement of the composite part formed from the conductor blank and the annular carbon disk in an injection-molding die;

removal of the rough commutator formed from the conductor blank, the annular carbon disk and the injection-molded support body from the injection-molding die;

opening of the bridging parts; and cutting into the annular carbon disk between each two conductor segments as far as the support body in order to form the carbon segments.

34. A method according to claim 33, wherein the electrically conductive connection between the contact regions of the conductor segments and the carbon segments is established by soldering.

35. A method according to claim 33, wherein the two halves of the injection-molding die bear sealingly against two annularly closed sealing faces, which are disposed on both end faces of the conductor blank and each of which is oriented in a plane perpendicular to the axis.

36. A method according to claim 35, wherein the two sealing faces are disposed opposite one another.

37. A method according to claim 33, wherein before the conductor blank is joined together with the annular carbon disk, the contact areas of the contact regions of the conductor segments are machined to a roughness of 50 to 150 $\mu$m and then provided with a corrosion-resistant metal coating.

38. A method according to claim 33, wherein the transition regions of the conductor blank are deformed upon closing of the injection-molding die.

* * * * *

UNITED STATES PATENT AND TRADEMARK OFFICE

CERTIFICATE OF CORRECTION

PATENT NO. : 6,617,743 B1 
DATED : September 9, 2003
INVENTOR(S) : Jose Potocnik et al.

It is certified that error appears in the above-identified patent and that said Letters Patent is hereby corrected as shown below:

Drawings,
Please replace the originally filed formal drawings with the attached drawings.

Signed and Sealed this

Twenty-second Day of June, 2004

Jon W. Dudas

JON W. DUDAS
*Acting Director of the United States Patent and Trademark Office*